United States Patent
Araujo Ortega et al.

(10) Patent No.: US 9,570,904 B2
(45) Date of Patent: Feb. 14, 2017

(54) TRANSMISSION BANDWIDTH EXTENDER/CATEGORY 6 SURGE PROTECTOR

(71) Applicant: ILLINOIS TOOL WORKS INC., Glenview, IL (US)

(72) Inventors: Adrian Araujo Ortega, Prairie du Chien, WI (US); Richard J. Urban, Prospect Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 135 days.

(21) Appl. No.: 14/557,740

(22) Filed: Dec. 2, 2014

(65) Prior Publication Data

US 2015/0171619 A1    Jun. 18, 2015

Related U.S. Application Data

(60) Provisional application No. 61/915,661, filed on Dec. 13, 2013.

(51) Int. Cl.
| | |
|---|---|
| *H02H 7/20* | (2006.01) |
| *H02H 3/22* | (2006.01) |
| *H04M 1/74* | (2006.01) |

(52) U.S. Cl.
CPC ............... *H02H 7/20* (2013.01); *H02H 3/22* (2013.01); *H04M 1/745* (2013.01)

(58) Field of Classification Search
CPC ............ H02H 7/20; H02H 3/22; H04M 1/745
USPC ........................................................ 361/119
See application file for complete search history.

(56) References Cited

U.S. PATENT DOCUMENTS

| | | |
|---|---|---|
| 4,846,732 A | 7/1989 | Meelhuysen |
| 5,706,160 A | 1/1998 | Latuszkin et al. |
| 6,671,154 B1 | 12/2003 | Deandrea et al. |
| 6,680,839 B2 | 1/2004 | Napiorkowski |

(Continued)

FOREIGN PATENT DOCUMENTS

WO    20120094508 A1    7/2012

OTHER PUBLICATIONS

Czapski, Joe, "Grounding and Noise Coupling Issues in Automated Measurement Systems", Apr. 2000 (pp. 1-4).

*Primary Examiner* — Scott Bauer
(74) *Attorney, Agent, or Firm* — McAndrews, Held & Malloy, Ltd.

(57) ABSTRACT

A surge protector for protecting telecommunications related equipment and other associated sensitive electrical components from over-voltage transient occurring on tip/ring conductors of telecommunication lines coupled thereto includes a printed circuit board and a plurality of surge protection circuits being mounted on the printed circuit board. Each of the plurality of surge protection circuits includes a first set of steering diodes and a second set of steering diodes. A common transient voltage clamping device has a first end connected to a first conductor lead and a second end connected to a second conductor lead so as to be shared by the plurality of surge protection circuits. A common pair of series-connected rectifier diodes has a first end also connected to the first conductor lead and a second end also connected to the second conductor lead so as to be shared by the plurality of surge protection circuits.

17 Claims, 6 Drawing Sheets

(56) References Cited

U.S. PATENT DOCUMENTS

| | | | |
|---|---|---|---|
| 7,515,391 B2* | 4/2009 | Casey | H04M 3/18 |
| | | | 361/111 |
| 2009/0161282 A1 | 6/2009 | Porter | |
| 2012/0176717 A1* | 7/2012 | Adomaitis | H05K 1/0257 |
| | | | 361/111 |

* cited by examiner

TRANSMISSION BANDWIDTH EXTENDER/CATEGORY 6 SURGE PROTECTOR

CROSS-REFERENCE TO RELATED APPLICATION

This application is a non-provisional application which claims the benefits of provisional application Ser. No. 61/915,661 filed on Dec. 13, 2013.

BACKGROUND OF THE INVENTION

1. Technical Field

The present disclosure relates generally to surge protection devices for protecting telecommunications related equipment and associated sensitive electrical components from over-voltage and/or over-current transient surges.

2. Prior Art

As is generally known to those skilled in the telecommunications industry, modern telecommunications related equipment is susceptible to transient surges such as those caused by lightning strikes and other voltage/current surges occurring on the incoming power lines. During the occurrence of the lightning strikes or the voltage/current surges on the incoming power lines in a power distribution network provided by electric utility companies, the power lines may become crossed-over or applied directly to the incoming telecommunication lines carrying voice signals, data signals and the like to a users' or consumers' equipment. The voice/data signals may be used for transmitting and/or receiving signals to and from various types of customers' electrical or office equipment, such as telephone sets, computers, facsimile machines, photocopiers, alarm devices, modems, or high-speed interface circuit devices (T-1 line, DSL network, Ethernet network, 10/100/1000 Base-T interface, etc.).

Therefore, it is typically necessary to provide telephone lines with surge protection devices so as to protect equipment connected to the transmission lines from transient voltage and/or current surges. Such surge protection devices are generally operated as shunt-connected clamping devices. Under normal operating conditions, the clamping devices act as a high-impedance path or ideally an open circuit to a protected transmission line. When a transient voltage exceeds the normal operating voltage of the transmission line, the clamping device will create a low-impedance path to ground so as to prevent damage to the equipment caused by the transient. Once the line voltage returns to a normal operating level, the clamping device will return automatically to a high-impedance state.

Accordingly, there exist various types of surge protector circuits for protecting telecommunications related equipment from transient voltage and/or current surges occurring on transmission lines coupled thereto. However, known surge protector circuits suffer from a number of disadvantages. For example, certain known Category 5 surge protector circuits could not meet the transmission line loss limitations set forth by the Telecommunication Industry Association (TIA) for Category 6 standards. In addition, while certain known Category 6 surge protector circuits provided good transmission loss control, they were unable to provide RJ-45 jack interface connections. It would therefore be desirable to provide an improved surge protector for protecting telecommunications related equipment from transient voltage surges occurring on transmission lines coupled thereto which meets the performance TIA specifications of Category 6 while providing standard RJ-45 connections without the need of adding magnetic components thereto.

The present surge protector includes a plurality of surge protection circuits and has particular applications in being used for protecting telecommunications related equipment and associated sensitive electrical components from over-voltage transients occurring on four differential-pairs of tip and ring conductors of telecommunication or signal lines coupled thereto.

BRIEF SUMMARY OF THE INVENTION

Accordingly, it is therefore a general advantage of the present invention to provide a surge protector for protecting telecommunications related equipment from transient voltage surges occurring on transmission lines coupled thereto which meets the performance TIA specifications of Category 6 while providing standard RJ-45 connections without the need of adding magnetic components thereto.

It is an advantage of the present invention to provide a surge protector for protecting telecommunications related equipment from transient voltage surges occurring on transmission lines coupled thereto which is relatively simple in its construction and is economical to manufacture and assemble.

It is another advantage of the present invention to provide a surge protector for protecting telecommunications related equipment from over-voltage transient surges for four differential-pairs of conductors.

It is still another advantage of the present invention to provide a surge protector for protecting telecommunications related equipment from over-voltage transient surges having a design that provides for reducing tip-to-ground and ring-to-ground capacitances and for matching the 100-ohms impedance of a four-pair Category 6 UTP cable.

It is a further advantage of the present invention to provide a surge protector for protecting telecommunications related equipment from over-voltage transient surges in which the surge protector includes a printed circuit board having a unique trace layout for mounting the electrical circuit components of the surge protector without the addition of magnetic components and for passing data signals at a high throughput up to the frequency of 250 MHz and with a data rate of 1 Gbps.

It is still a further advantage of the present invention to provide a surge protector for protecting telecommunications related equipment from over-voltage transient surges which is characterized by a design having a small profile and using a smaller number of Transient Voltage Semiconductor clamping devices than prior art surge protectors.

In a preferred embodiment of the present invention, there is provided a surge protector for protecting telecommunications related equipment and other associated sensitive electrical components from over-voltage transient occurring on tip/ring conductors of telecommunication lines coupled thereto which includes a printed circuit board and a plurality of surge protection circuits being mounted on the printed circuit board. Each of the plurality of surge protection circuits includes a first set of steering diodes and a second set of steering diodes.

Each of the first set of steering diodes includes a first pair of series-connected diodes and a second pair of series-connected diodes. The first pair of series-connected diodes has a first end connected to a first conductor lead and a second end. The second pair of series-connected diodes has a first end connected to a second conductor lead and a second end connected to the second end of the first pair of series-connected diodes and to a respective tip node.

Each of the second set of steering diodes includes a third pair of series-connected diodes and a fourth pair of series-connected diodes. The third pair of series-connected diodes has a first end connected to the first conductor lead and a second end. The fourth pair of series-connected diodes has a first end connected to the second conductor lead and a second end connected to the second end of the third pair of series-connected diodes and to a respective ring node.

A common transient voltage clamping device has a first end connected to the first conductor lead and a second end connected to the second conductor lead so as to be shared by the plurality of surge protection circuits. A common pair of series-connected rectifier diodes has a first end also connected to the first conductor lead and a second end also connected to the second conductor lead so as to be shared by the plurality of surge protection circuits.

An input side connector device is coupled to the respective tip and ring nodes for connecting to incoming telecommunication lines. An output side connector device is coupled to the respective tip and ring nodes for connecting to customers' electrical equipment to be protected.

BRIEF DESCRIPTION OF THE DRAWINGS

These and other advantages of the present invention will become more fully apparent from the following detailed description when read in conjunction with the accompanying sheets of drawings with like reference numerals indicating corresponding like parts, elements, components, steps and processes, wherein.

DETAILED DESCRIPTION OF THE INVENTION

It is to be distinctly understood at the outset that the present invention shown in the drawings and described in detail in conjunction with the preferred embodiments is not intended to serve as a limitation upon the scope or teachings thereof, but is to be considered merely an exemplification of the principles of the present invention.

Referring now generally to FIGS. 1 through 6, a Category 6 surge protector in accordance with an embodiment of the present disclosure is shown. The illustrated surge protector is used for interconnection between transmission lines in a signal distribution network and the various types of sensitive electrical equipment so as to protect the same from damage caused by transient voltage surges.

Figure 1:
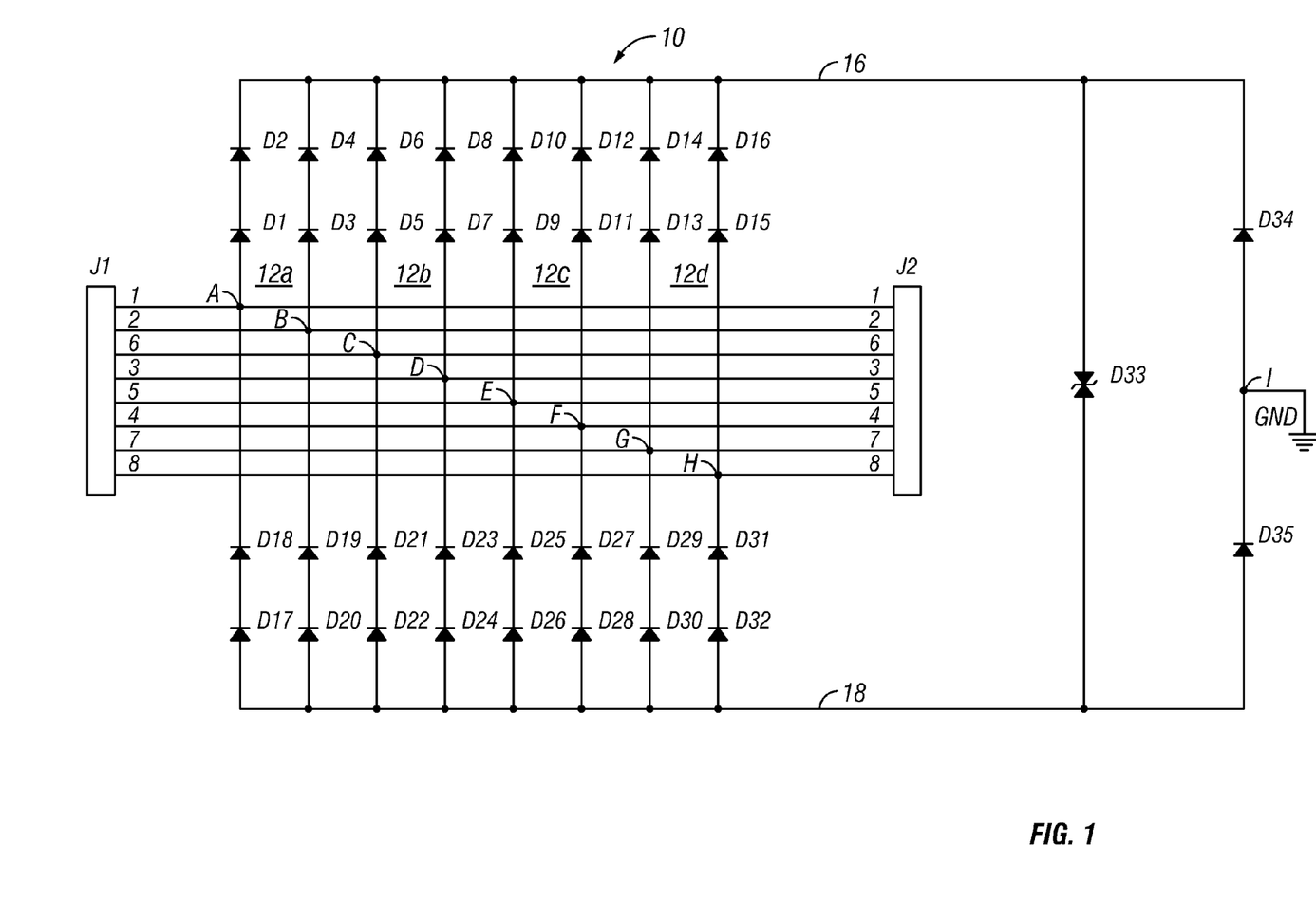
FIG. 1 is a schematic circuit diagram of a Category 6 surge protector, constructed in accordance with the principles of the present invention.

As illustrated in FIG. 1, there is shown a schematic circuit diagram of a surge protector 10 which includes a plurality of identical surge protection circuits, constructed in accordance with the principles of the present invention. In the illustrated embodiment, the surge protector 10 includes four identical surge protection circuits 12a-12d. Each of the identical surge protection circuits is connectible between two wires (tip and ring) of incoming transmission lines (line side) of a signal distribution network and two wires (tip and ring) of a customers' electrical equipment (equipment side) to be protected.

For example, the surge protection circuit 12a in the illustrated embodiment includes a first set of steering diodes D1, D2, D17, D18; a Transient Voltage Semiconductor (TVS) clamping device D33; a second set of steering diodes D3, D4, D19, D20; and a pair of rectifier diodes D34, D35. The steering diodes are high-speed, low capacitance diodes so to provide low tip-to-ground and ring-to-ground capacitances and low transmission loss. As a result, the surge protector is capable of meeting the transmission performance requirements as described in the TIA Standard, TIA-568-B.2-10 Category 6 standards. The surge protector is designed to protect telecommunications related equipment against over-voltage transient surges while allowing broadband (between 1 MHz to 250 MHz) and throughput at a high data bit rate (1 Gbps) while meeting the safety standards of UL.

Figure 2:
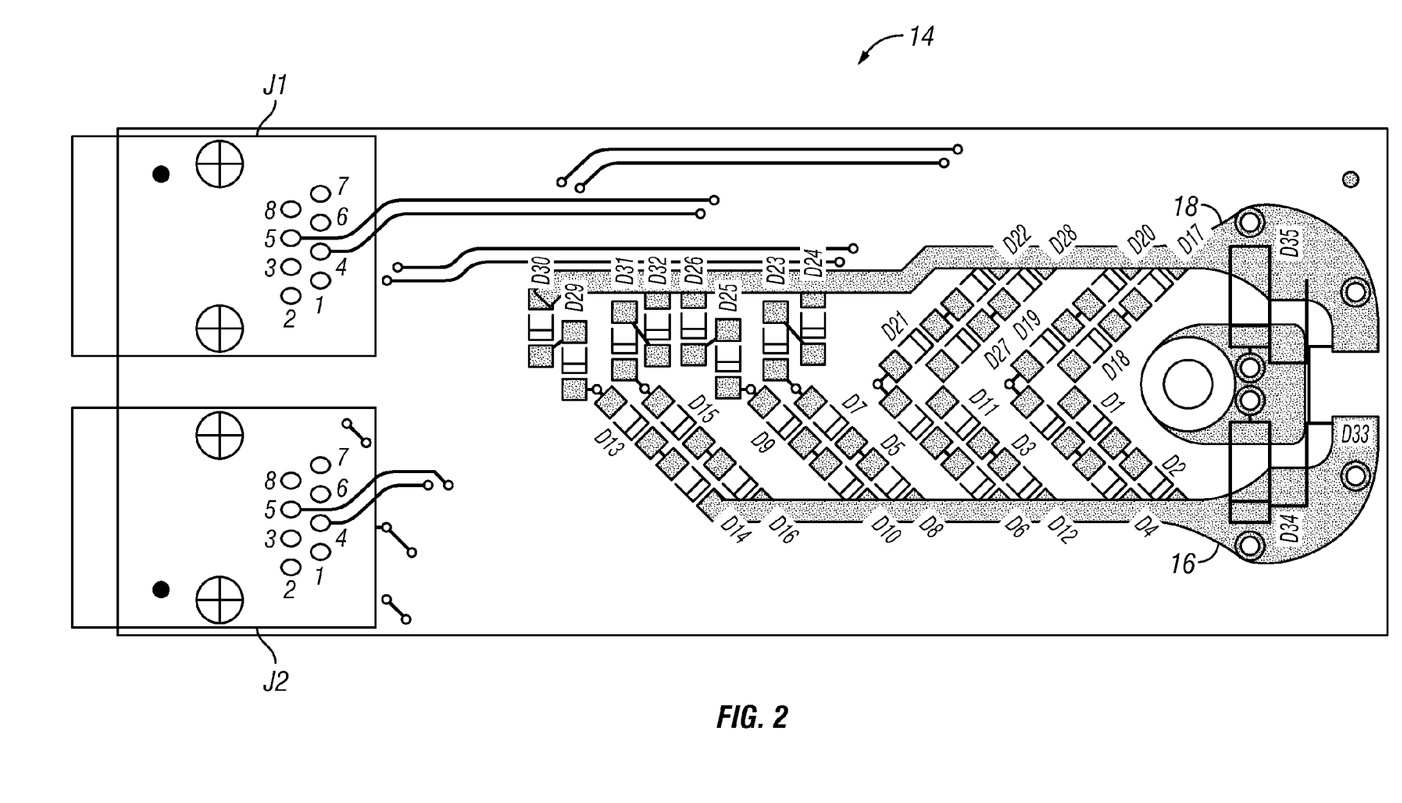
FIG. 2 is a top plan view of a printed circuit board used for mounting the electrical circuit components of FIG. 1, showing the trace layout with the electrical components being removed.
Figure 3:
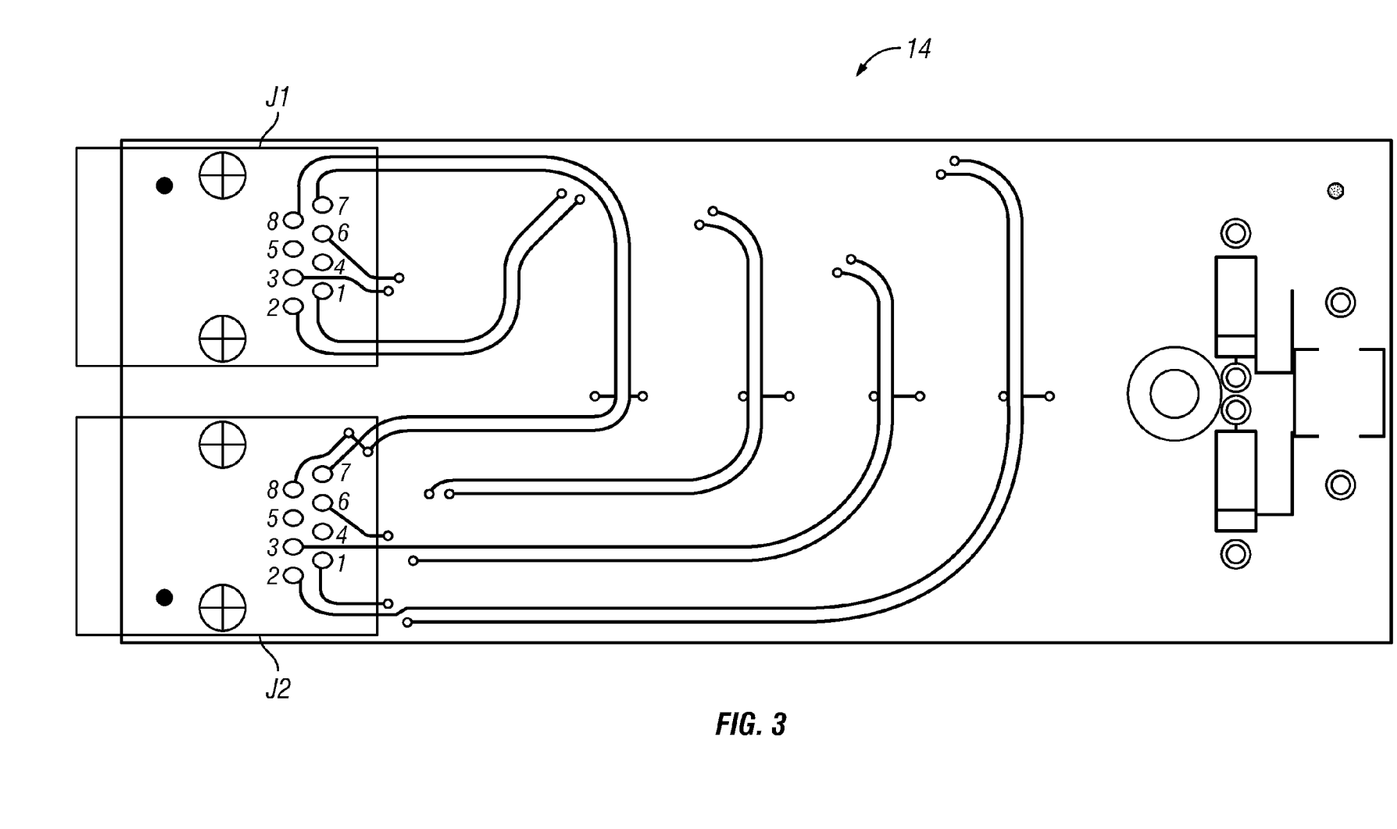
FIG. 3 is a bottom plan view of the printed circuit board of FIG. 2, showing the trace layout.
Figure 4:
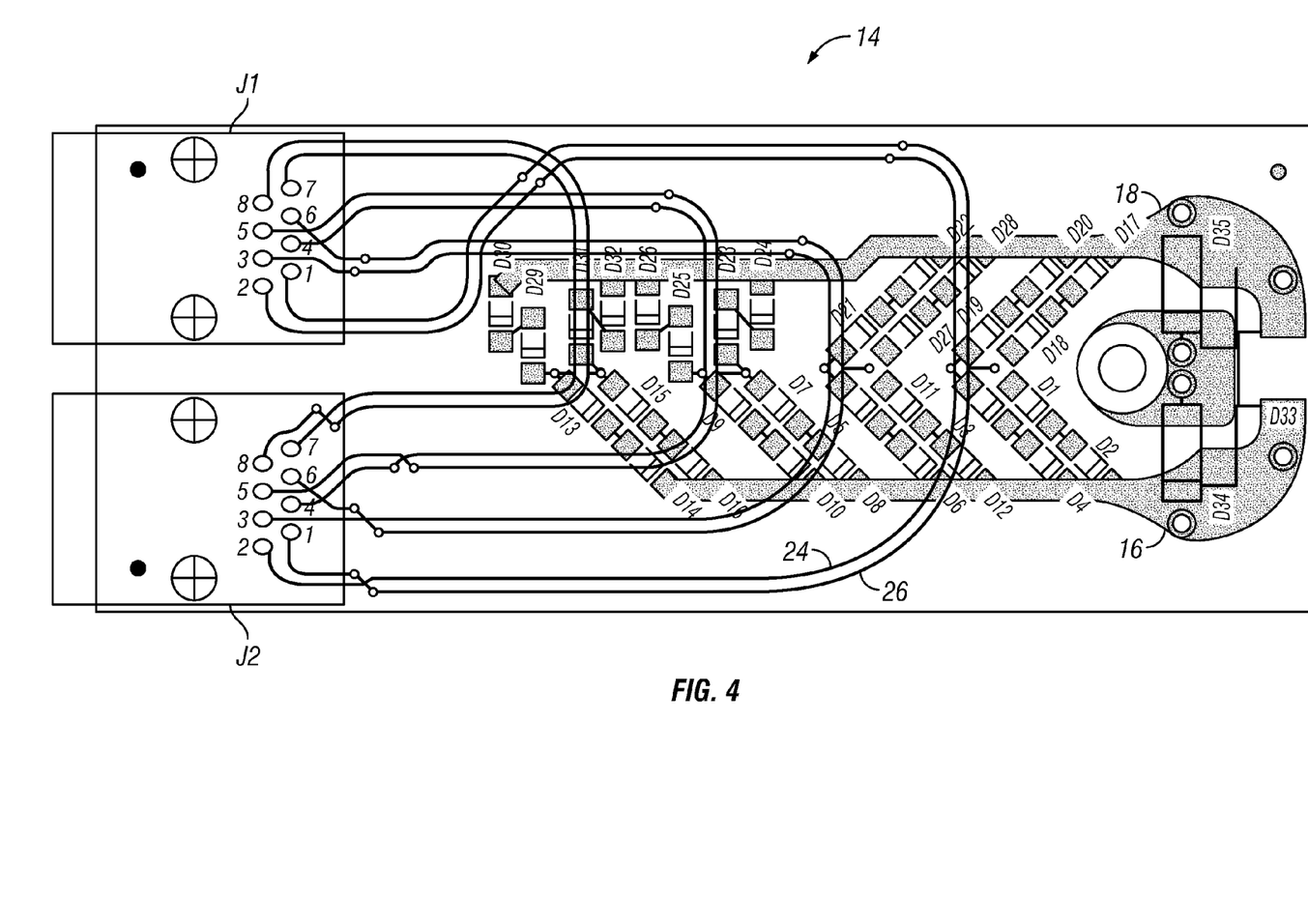
FIG. 4 is a top plan view of the printed circuit board, illustrating the combined layout of the conductive traces of FIGS. 2 and 3 with the electrical components being removed.

Referring now to FIG. 2, a top plan view of an exemplary printed circuit board 14 for mounting the electrical circuit components of FIG. 1 is shown, but with the electrical components being removed. FIG. 3 shows a bottom plan view of the printed circuit board 14 of FIG. 2. FIG. 4 is a top plan view of the printed circuit board 14 which shows a combined layout of the conductive traces of FIGS. 2 and 3 with the electrical components being removed.

Figure 5:
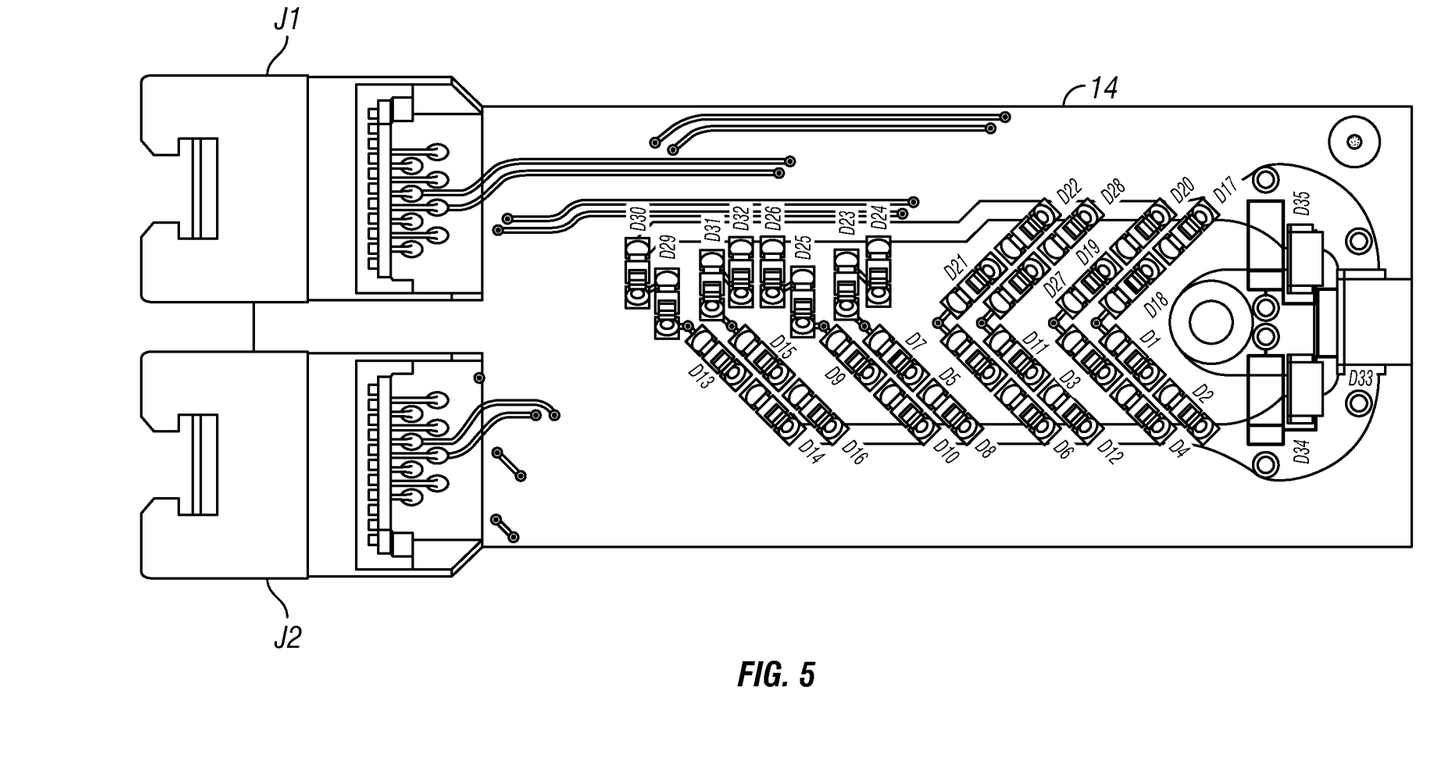
FIG. 5 is a top plan view of the printed circuit board in its fully assembled condition with all of the electrical components mounted thereon.
Figure 6:
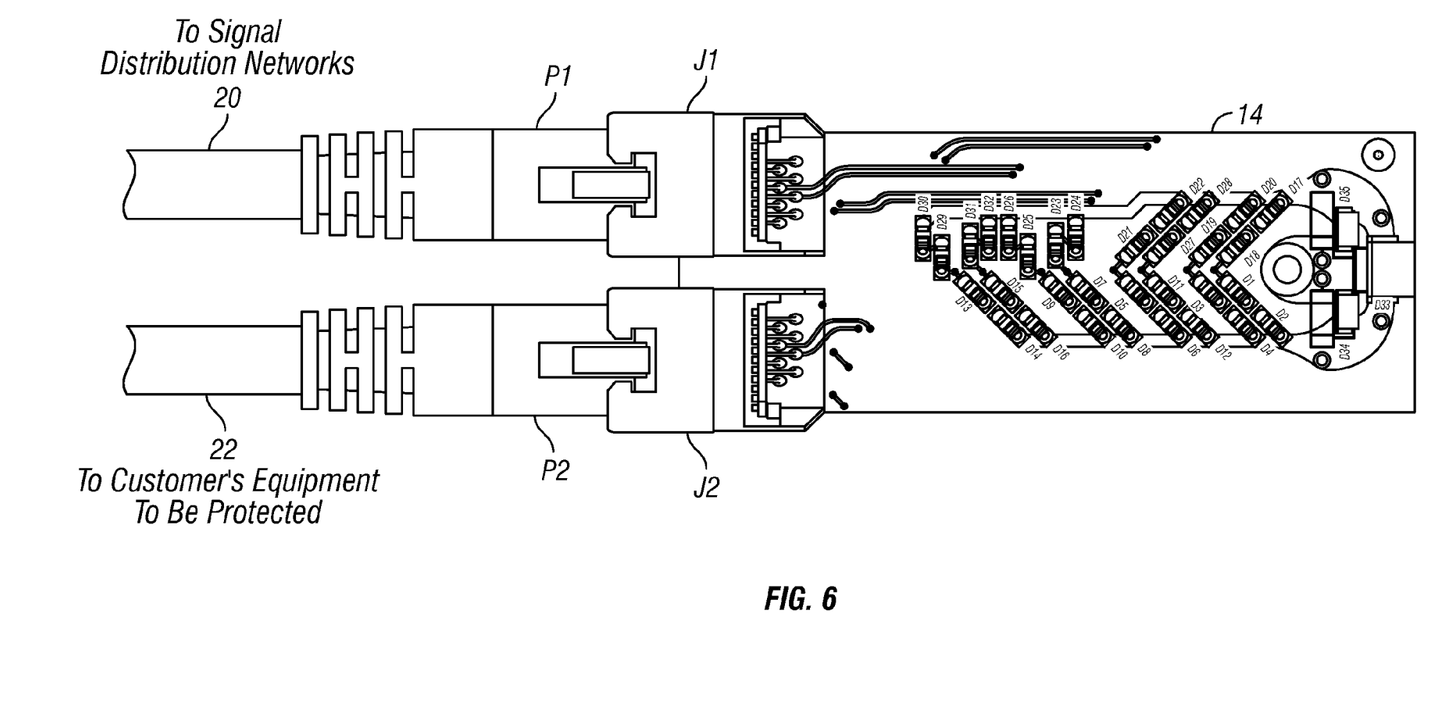
FIG. 6 is a top plan view similar to FIG. 5, illustrating the connections of the 4-pair of incoming/outgoing Category 6 UTP cables to the respective input and output side RJ-45 jack connectors.

FIG. 5 is a top plan view of the printed circuit board in its fully assembled condition with all of the electrical components mounted thereon. FIG. 6 is a top plan view, which is similar to FIG. 5, but depicts also the connections of the 4-pair of incoming and outgoing Category 6 UTP (unshielded twisted pair) cables to the corresponding input and output side RJ-45 jack connectors.

With attention directed back to the schematic circuit diagram of FIG. 1, the diodes D1 and D2 in the first set of steering diodes in the surge protection circuit 12a are connected together in series which are then joined to the series-connected diodes D17 and D18 in the first set. The anode of the diode D1 and the cathode of the diode D18 are connected together at node A and further joined to pin 1 (i.e., tip) of input side RJ-45 connector J1 and to pin 1 (i.e., tip) of output side RJ-45 connector J2. The cathode of the diode D2 is connected to a first conductor lead 16, and the anode of the diode D17 is connected to a second conductor lead 18.

The diodes D3 and D4 in the second set of steering diodes in the surge protection circuit 12a are connected together in series which are then joined in series to the series-connected diodes D19 and D20 in the second set. The anode of the diode D3 and the cathode of the diode D19 are connected together at node B and further joined to pin 2 (i.e., ring) of the input side RJ-45 connector J1 and to pin 2 (i.e., ring) of the output side RJ-45 connector J2. The cathode of the diode D4 is also connected to the first conductor lead 16, and the anode of the diode D20 is also connected to the second conductor lead 18.

Similarly, the diodes D5 and D6 in the first set of steering diodes in the surge protection circuit 12b are connected together in series which are then joined to the series-connected diodes D22 and D21 in the first set. The anode of the diode D5 and the cathode of the diode D21 are connected together at node C and further joined to pin 6 (i.e., tip) of input side RJ-45 connector J1 and to pin 6 (i.e., tip) of output side RJ-45 connector J2. The cathode of the diode D6 is also connected to the first conductor lead 16, and the anode of the diode D22 is also connected to the second conductor lead 18.

The diodes D7 and D8 in the second set of steering diodes in the surge protection circuit 12b are connected together in series which are then joined in series to the series-connected diodes D23 and D24 in the second set. The anode of the diode D7 and the cathode of the diode D23 are connected together at node D and further joined to pin 3 (i.e., ring) of the input side RJ-45 connector J1 and to pin 3 (i.e., ring) of the output side RJ-45 connector J2. The cathode of the diode D8 is also connected to the first conductor lead 16, and the anode of the diode D24 is also connected to the second conductor lead 18.

In addition, the diodes D9 and D10 in the first set of steering diodes in the surge protection circuit 12c are connected together in series which are then joined to the series-connected diodes D26 and D25 in the first set. The anode of the diode D9 and the cathode of the diode D25 are connected together at node E and further joined to pin 5 (i.e., tip) of input side RJ-45 connector J1 and to pin 5 (i.e., tip) of output side RJ-45 connector J2. The cathode of the diode D10 is also connected to the first conductor lead 16, and the anode of the diode D26 is also connected to the second conductor lead 18.

The diodes D11 and D12 in the second set of steering diodes in the surge protection circuit 12c are connected together in series which are then joined in series to the series-connected diodes D27 and D28 in the second set. The anode of the diode D11 and the cathode of the diode D27 are connected together at node F and further joined to pin 4 (i.e., ring) of the input side RJ-45 connector J1 and to pin 4 (i.e., ring) of the output side RJ-45 connector J2. The cathode of the diode D12 is also connected to the first conductor lead 16, and the anode of the diode D28 is also connected to the second conductor lead 18.

Finally, the diodes D13 and D14 in the first set of steering diodes in the surge protection circuit 12d are connected together in series which are then joined to the series-connected diodes D30 and D29 in the first set. The anode of the diode D13 and the cathode of the diode D29 are connected together at node G and further joined to pin 7 (i.e., tip) of input side RJ-45 connector J1 and to pin 7 (i.e., tip) of output side RJ-45 connector J2. The cathode of the diode D14 is also connected to the first conductor lead 16, and the anode of the diode D30 is also connected to the second conductor lead 18.

The diodes D15 and D16 in the second set of steering diodes in the surge protection circuit 12d are connected together in series which are then joined in series to the series-connected diodes D31 and D32 in the second set. The anode of the diode D15 and the cathode of the diode D31 are connected together at node H and further joined to pin 8 (i.e., ring) of the input side RJ-45 connector J1 and to pin 8 (i.e., ring) of the output side RJ-45 connector J2. The cathode of the diode D16 is also connected to the first conductor lead 16, and the anode of the diode D32 is also connected to the second conductor lead 18.

The Transient Voltage Semiconductor (TVS) clamping device D33 is connected across the first conductor lead and the second conductor lead 18. The pair of rectifier diodes D34 and D35 are connected in series which are then joined in parallel across the respective first and second ends of the clamping device D33. In particular, the cathode of the diode D34 is connected to the first conductor lead 16 and the anode of the diode D35 is connected to the second conductor lead 18. The anode of the diode D34 is connected to the cathode of the diode D35 and to a node I. The node I is further connected to a ground GND.

In the preferred embodiment, each of the low capacitance steering diodes D1 through D32 are similar to the type BAV103-7, manufactured by Vishay Intertechnology, Inc. of Malvern, Pa. Further, each of the rectifier diodes D34 and D35 are similar to the type BYG21M-E3/TR, also manufactured by Vishay. The TVS clamping device D33 is similar to the type 1.5KE, also manufactured by Vishay.

As can be best seen from FIGS. 2 through 4, the printed circuit board 14 has a unique trace layout so as to extend the bandwidth of the present surge protector beyond 100 MHz and up to the frequency of 250 MHz. The electrical components are mounted on the printed circuit board and are designed to reduce the tip-to-ground and ring-to-ground capacitances. Furthermore, the geometry and placement of the conductive traces on the printed circuit board are designed so as to match the 100-ohms impedance of the 4-pair Category 6 UTP cables and to reduce the transmission loss in the frequency range of 1 MHz to 250 MHz so as to meet the transmission performance requirements as described in the TIA Standard, TIA-568-B.2-10 for Category 6.

It has been found that this can be achieved by maintaining the ratio of the width of the conductive traces to the distance separation between each pair of conductive traces to be 1:1. For example, if the width of the tip and ring conductive traces have a dimension of 0.018 inch, then the distance between the tip conductive trace and the ring conductive trace is maintained to be also 0.018 inch. Also, it is preferred that each pair of the tip and ring conductive traces be of substantially equal length so as to reduce transmission issues. In addition, the construction of the printed circuit board has also been designed to meet UL 497 standards.

In particular, as can best be seen from FIG. 4, there is depicted the combined layout of the conductive traces shown in FIGS. 2 and 3 with the electrical components removed. In order to achieve low transmission loss, the widths of the tip conductive trace 24 and of the ring conductive trace 26 are each made to be substantially equal to the distance separation between the tip and ring conductive traces. Further, the total length of the tip conductive trace 24 is made to be substantially equal to the total length of the ring conductive trace 26 so as to provide low transmission loss.

Referring now to FIGS. 5 and 6, the electrical circuit components of the four surge protection circuits 12a-12d of FIG. 1 are shown. The first surge protection circuit 12a in the illustrated embodiment includes the first set of steering diodes D1, D2, D17, D18; the Transient Voltage Semiconductor (TVS) clamping device D33; the second set of steering diodes D3, D4, D19, D20; and the pair of rectifier diodes D34, D35. The second surge protection circuit 12b in the illustrated embodiment includes the first set of steering diodes D5, D6, D21, D22; the Transient Voltage Semiconductor (TVS) clamping device D33; the second set of steering diodes D7, D8, D23, D24; and the pair of rectifier diodes D34, D35.

Further, the third surge protection circuit 12c in the illustrated embodiment includes the first set of steering diodes D9, D10, D25, D26; the Transient Voltage Semiconductor (TVS) clamping device D33; the second set of steering diodes D11, D12, D27, D28; and the pair of rectifier diodes D34, D35. The fourth surge protection circuit 12d in the illustrated embodiment includes the first set of steering diodes D13, D14, D29, D30; the Transient Voltage Semiconductor (TVS) clamping device D33; the second set of steering diodes D15, D16, D31, D32; and the pair of rectifier diodes D34, D35.

The surge protector 10 consisting of the plurality of four identical surge protection circuits 12a-12d mounted on the printed circuit board 14 are designed to protect four differential-pair conductors from over-voltage transient surges. The four surge protection circuits are configured in such a way so that they all share the common TVS clamping device D33; the common pair of rectifier diodes D34, D35; and the common connection to the ground GND. The common ground GND provides suitable means for connecting to a protective earth located within a building or premise. The printed circuit board 14 is fitted with two ports, one for the unprotected input side and one for the protected output side using the two RJ-45 jack connectors J1 and J2, respectively.

Referring again to FIG. 6, there is depicted an incoming Category 6 UTP cable 20 having its one end coupled to the signal distribution network (not shown) and its other end coupled to a RJ-45 plug connector P1. The cable 20 includes the four differential-pairs of wires (8 conductors) with each pair being joined to the plug connector P1, which mates with the respective pins 1 through 8 of the input side Rj-45 jack connector J1.

In particular, a first pair (not shown) of the four differential-pairs of wires is coupled to the respective tip and ring pins 1 and 2 of the RJ-45 jack connector J1. A second pair (not shown) of the four differential-pairs of wires is coupled to the respective tip and ring pins 6 and 3 of the RJ-45 jack connector J1. A third pair (not shown) of the four differential-pairs of wires is coupled to the respective tip and ring pins 5 and 4 of the RJ-45 jack connector J1. A fourth pair (not shown) of the four differential-pairs of wires is coupled to the respective tip and ring pins 7 and 8 of the RJ-45 jack connector J1.

In addition, there is illustrated an outgoing Category 6 UTP cable 22 having its one end coupled to the customers' equipment to be protected (also not shown) and its other end coupled to a RJ-45 plug connector P2. The cable 22 includes the four differential-pairs of wires (8 conductors) with each pair being joined to the plug connector P2, which mates with the respective pins 1 through 8 of the output side RJ-45 jack connector J2.

Similarly, a first pair (not shown) of the four differential-pairs of wires is coupled to the respective tip and ring pins 1 and 2 of the RJ-45 jack connector J2. A second pair (not shown) of the four differential-pairs of wires is coupled to the respective tip and ring pins 6 and 3 of the RJ-45 jack connector J2. A third pair (not shown) of the four differential-pairs of wires is coupled to the respective tip and ring pins 5 and 4 of the RJ-45 jack connector J2. A fourth pair (not shown) of the four differential-pairs of wires is coupled to the respective tip and ring pins 7 and 8 of the RJ-45 jack connector J2.

In view of the foregoing detailed description, it can be seen that the surge protector of the present invention controls the 100-ohms impedance and minimizes the transmission loss without the need for adding magnetic circuit components by developing specific characteristics of the geometry of the conductive traces as discussed above on the printed circuit board. As a consequence, this allows the four surge protection circuits 12a-12d to use a small footprint and only a single two-sided printed circuit board 14.

In addition, the surge protector 10 is uniquely designed so as to reduce the number of components from 8-to-1 of the TVS clamping devices as compared to the prior art surge protectors, thereby reducing the expensive cost of manufacturing and assembly. The present surge protector serves to protect telecommunications related equipment from over-voltage transient surges for four differential-pairs of conductors in CAT 6 UTP cables and associated sensitive electrical components connected to the cables.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A surge protector for protecting telecommunications related equipment and other associated sensitive electrical components from over-voltage transient occurring on tip/ring conductors of telecommunication lines coupled thereto, comprising:
   a printed circuit board;
   a plurality of surge protection circuits being mounted on said printed circuit board;
      each of said plurality of surge protection circuits including a first set of steering diodes and a second set of steering diodes;
      each of said first set of steering diodes including a first pair of series connected diodes and a second pair of series-connected diodes;
      said first pair of series-connected diodes having a first end connected to a first conductor lead and a second end, said second pair of series-connected diodes having a first end connected to a second conductor lead and a second end connected to the second end of said first pair of series-connected diodes and to a respective tip node;
      each of said second set of steering diodes including a third pair of series-connected diodes and a fourth pair of series-connected diodes;
      said third pair of series-connected diodes having a first end connected to said first conductor lead and a second end, said fourth pair of series-connected diodes having a first end connected to said second conductor lead and a second end connected to the second end of said third pair of series-connected diodes and to a respective ring node;
   a common transient voltage clamping device having a first end connected to said first conductor lead and a second end connected to said second conductor lead so as to be shared by said plurality of surge protection circuits;
   a common pair of series-connected rectifier diodes having a first end also connected to said first conductor lead and a second end also connected to said second conductor lead so as to be shared by said plurality of surge protection circuits;

an input side connector device coupled to the respective tip and ring nodes for connecting to incoming telecommunication lines; and an output side connector device coupled to the respective tip and ring nodes for connecting to customers' electrical equipment to be protected, the ratio of the width of tip and ring conductive traces on the printed circuit board to the distance of separation between the tip conductive trace and the ring conductive trace being 1:1 so as to reduce transmission loss.

2. A surge protector as claimed in claim 1, wherein said input side connector device consists of a RJ-45 jack connector.

3. A surge protector as claimed in claim 2, wherein said output side connector device consist of a RJ-45 jack connector.

4. A surge protector as claimed in claim 1, wherein each of said first set of steering diodes is formed of a high-speed, low capacitance diode.

5. A surge protector as claimed in claim 4, wherein each of said second set of steering diodes is formed of a high-speed, low capacitance diode.

6. A surge protector as claimed in claim 5, wherein said common transient voltage clamping device is formed of a Transient Voltage Semiconductor (TVS) clamping device.

7. A surge protector as claimed in claim 1, wherein said tip and ring conductive traces are substantially equal in length so as to provide low transmission loss.

8. A surge protector as claimed in claim 7, further comprising a common ground lead connected to said common pair of series-connected rectifier diodes for providing connection to a protective earth ground located at a customers' premises.

9. A surge protector for protecting telecommunications related equipment and other associated sensitive electrical components from over-voltage transient occurring on four differential-pairs of tip and ring conductors of telecommunication lines coupled thereto, comprising:
a printed circuit board;
four surge protection circuits being mounted on said printed circuit board;
each of said four surge protection circuits including a first set of steering diodes and a second set of steering diodes;
each of said first set of steering diodes including a first pair of series connected diodes and a second pair of series-connected diodes;
said first pair of series-connected diodes having a first end connected to a first conductor lead and a second end, said second pair of series-connected diodes having a first end connected to a second conductor lead and a second end connected to the second end of said first pair of series-connected diodes and to a respective tip node;
each of said second set of steering diodes including a third pair of series connected diodes and a fourth pair of series connected diodes;
said third pair of series-connected diodes having a first end connected to said first conductor lead and a second end, said fourth pair of series-connected diodes having a first end connected to said second conductor lead and a second end connected to the second end of said third pair of series connected diodes and to a respective ring node;
a common transient voltage clamping device having a first end connected to said first conductor lead and a second end connected to said second conductor lead so as to be shared by said four surge protection circuits;
a common pair of series-connected rectifier diodes having a first end also connected to said first conductor lead and a second end also connected to said second conductor lead so as to be shared by said four surge protection circuits;
an input side connector device coupled to the respective tip and ring nodes for connecting to incoming telecommunication lines; and
an output side connector device coupled to the respective tip and ring nodes for connecting to customers' electrical equipment to be protected, the ratio of the width of tip and ring conductive traces on the printed circuit board to the distance of separation between the tip conductive trace and the ring conductive trace being 1:1 so as to reduce transmission loss.

10. A surge protector as claimed in claim 9, wherein said input side connector device consist of a RJ-45 jack connector.

11. A surge protector as claimed in claim 10, wherein said output side connector device consist of a RJ-45 jack connector.

12. A surge protector as claimed in claim 9, wherein each of said first set of steering diodes is formed of a high-speed, low capacitance diode.

13. A surge protector as claimed in claim 12, wherein each of said second set of steering diodes is formed of a high-speed, low capacitance diode.

14. A surge protector as claimed in claim 13, wherein each of said voltage clamping devices is formed of a Transient Voltage Semiconductor (TVS) clamping device.

15. A surge protector as claimed in claim 9, wherein said tip and ring conductive traces are substantially equal in length so as to provide low transmission loss.

16. A surge protector for protecting telecommunications related equipment and other associated sensitive electrical components from over voltage transient occurring on tip/ring conductors of telecommunication lines coupled thereto, comprising:
at least one surge protection circuit;
said at least one surge protection circuit including a first set of steering diodes and second set of steering diodes;
each of said first set of steering diodes including a first pair of series connected diodes and a second pair of series connected diodes;
said first pair of series-connected diodes having a first end connected to a first conductor lead and a second end, said
second pair of series-connected diodes having a first end connected to a second conductor lead and a second end connected to the second end of said first pair of series-connected diodes and to a respective tip node;
each of said second set of steering diodes including a third pair of series connected diodes and a fourth pair of series-connected diodes;
said third pair of series-connected diodes having a first end connected to said first conductor lead and a second end, said fourth pair of series-connected diodes having a first end connected to said second conductor lead and a second end connected to the second end of said third pair of series connected diodes and to a respective ring node;

a common transient voltage clamping device having a first end connected to said first conductor lead and a second end connected to said second conductor lead; and a common pair of series-connected rectifier diodes having a first end also connected to said first conductor lead and a second end also connected to said second conductor lead, the ratio of the width of tip and ring conductive traces on the printed circuit board to the distance of separation between the tip conductive trace and the ring conductive trace being 1:1 so as to reduce transmission loss.

17. A surge protector as claimed in claim 16, wherein said tip and ring conductive traces are substantially equal in length so as to provide low transmission loss.

* * * * *